(12) United States Patent
Garg et al.

US009860580B1

(10) Patent No.: US 9,860,580 B1
(45) Date of Patent: Jan. 2, 2018

(54) PRESENTATION OF STREAMING CONTENT

(71) Applicant: Amazon Technologies, Inc., Reno, NV (US)

(72) Inventors: Parag K. Garg, Woodinville, WA (US); Samuel S. Gigliotti, Seattle, WA (US); Cody B. Meyer, Seattle, WA (US); Jonathan D. Morrison, II, North Bend, WA (US)

(73) Assignee: Amazon Technologies, Inc., Reno, NV (US)

( * ) Notice: Subject to any disclaimer, the term of this patent is extended or adjusted under 35 U.S.C. 154(b) by 110 days.

(21) Appl. No.: 13/624,266

(22) Filed: Sep. 21, 2012

(51) Int. Cl.
H04N 21/40 (2011.01)

(52) U.S. Cl.
CPC .................. H04N 21/40 (2013.01)

(58) Field of Classification Search
CPC ............ G06F 3/0484; G06F 17/30775; G06F 17/30905; G06F 3/06; H04N 2201/0089; H04N 13/0048; H04N 21/2365; G09G 2380/16; G09G 5/397; Y10S 715/977
See application file for complete search history.

(56) References Cited

U.S. PATENT DOCUMENTS

| 6,414,720 | B1 * | 7/2002 | Tsukidate et al. ............. 348/469 |
| 6,570,606 | B1 * | 5/2003 | Sidhu et al. .................. 348/14.1 |
| 6,993,782 | B1 * | 1/2006 | Newberry et al. .............. 725/39 |
| 7,650,361 | B1 * | 1/2010 | Wong et al. ............ 707/999.107 |
| 8,041,750 | B2 * | 10/2011 | Volk .............................. 707/804 |
| 8,584,165 | B1 * | 11/2013 | Kane .................. H04N 21/2225 707/784 |
| 9,396,195 | B1 * | 7/2016 | Beguelin ........... G06F 17/30053 |
| 2002/0114360 | A1 * | 8/2002 | Perlman ................... H04N 5/76 370/536 |
| 2003/0002481 | A1 * | 1/2003 | Laursen et al. ............... 370/352 |
| 2004/0125121 | A1 * | 7/2004 | Pea et al. ....................... 345/716 |
| 2005/0280651 | A1 * | 12/2005 | Geddes ......................... 345/547 |
| 2006/0234685 | A1 * | 10/2006 | McDonough ......... H04H 60/15 455/414.1 |
| 2007/0208771 | A1 * | 9/2007 | Platt .................. G06F 17/30038 |
| 2008/0232561 | A1 * | 9/2008 | Hildreth et al. ........... 379/88.22 |
| 2008/0240232 | A1 * | 10/2008 | Pak ......................... 375/240.01 |
| 2009/0012940 | A1 * | 1/2009 | Ives .................. G06F 17/30867 |
| 2009/0307211 | A1 * | 12/2009 | Kenig et al. ...................... 707/5 |
| 2010/0057928 | A1 * | 3/2010 | Kapoor ............. G06F 17/30053 709/231 |
| 2010/0199312 | A1 * | 8/2010 | Chang et al. ................... 725/46 |
| 2010/0205636 | A1 * | 8/2010 | Coburn et al. ................. 725/46 |
| 2010/0274674 | A1 * | 10/2010 | Roberts et al. ............ 705/14.73 |
| 2010/0275233 | A1 * | 10/2010 | Soohoo ............. H04N 5/44543 725/46 |

(Continued)

Primary Examiner — Jeffrey A Gaffin
Assistant Examiner — Mandrita Brahmachari
(74) Attorney, Agent, or Firm — Eversheds Sutherland (US) LLP

(57) ABSTRACT

Described herein are systems and methods for presenting network media streaming content. A user interface is presented to the user in which content is presented soon after activation of the presentation device such as a television or sound system. The user interface may be configured to accept an input such as the user activating a "channel up" or a "channel down" button on a remote control after which different content is presented. The content presented may be determined randomly or may be selected.

15 Claims, 10 Drawing Sheets

(56) References Cited

U.S. PATENT DOCUMENTS

| | | | |
|---|---|---|---|
| 2010/0289872 A1* | 11/2010 | Funabiki et al. | 348/43 |
| 2011/0075990 A1* | 3/2011 | Eyer | 386/241 |
| 2011/0107374 A1* | 5/2011 | Roberts | H04N 5/44543 725/46 |
| 2011/0202270 A1* | 8/2011 | Sharma et al. | 701/201 |
| 2011/0227907 A1* | 9/2011 | Sato | G02B 27/017 345/212 |
| 2011/0243527 A1* | 10/2011 | Hayashi | 386/241 |
| 2012/0150950 A1* | 6/2012 | Osann et al. | 709/203 |
| 2013/0060641 A1* | 3/2013 | Al Gharabally | 705/14.66 |
| 2013/0155076 A1* | 6/2013 | Wodka et al. | 345/502 |
| 2014/0059244 A1* | 2/2014 | Panje et al. | 709/231 |
| 2014/0068443 A1* | 3/2014 | Eng et al. | 715/733 |

* cited by examiner

PRESENTATION OF STREAMING CONTENT

BACKGROUND

A wide variety of content is available to users for access electronically. This content may include television programming, audio books, music, movies, and so forth. The content may be delivered using broadcast, cable, satellite, networks such as the Internet, playback from a local media device such as a digital versatile disk ("DVD"), compact disc ("CD"), flash memory, hard disk drive, and so forth. Content provided via the Internet or another network may be streamed to a media device for presentation. During streaming, portions of the content are delivered while presentation of the content may be taking place.

Traditionally, streamed content has been presented to a user following the user selecting a content provider, selecting a particular piece of content, and so forth. However, this approach may result in an adverse user experience. Furthermore, this process of explicit selection reduces spontaneity of the content consumption.

Figure 1:
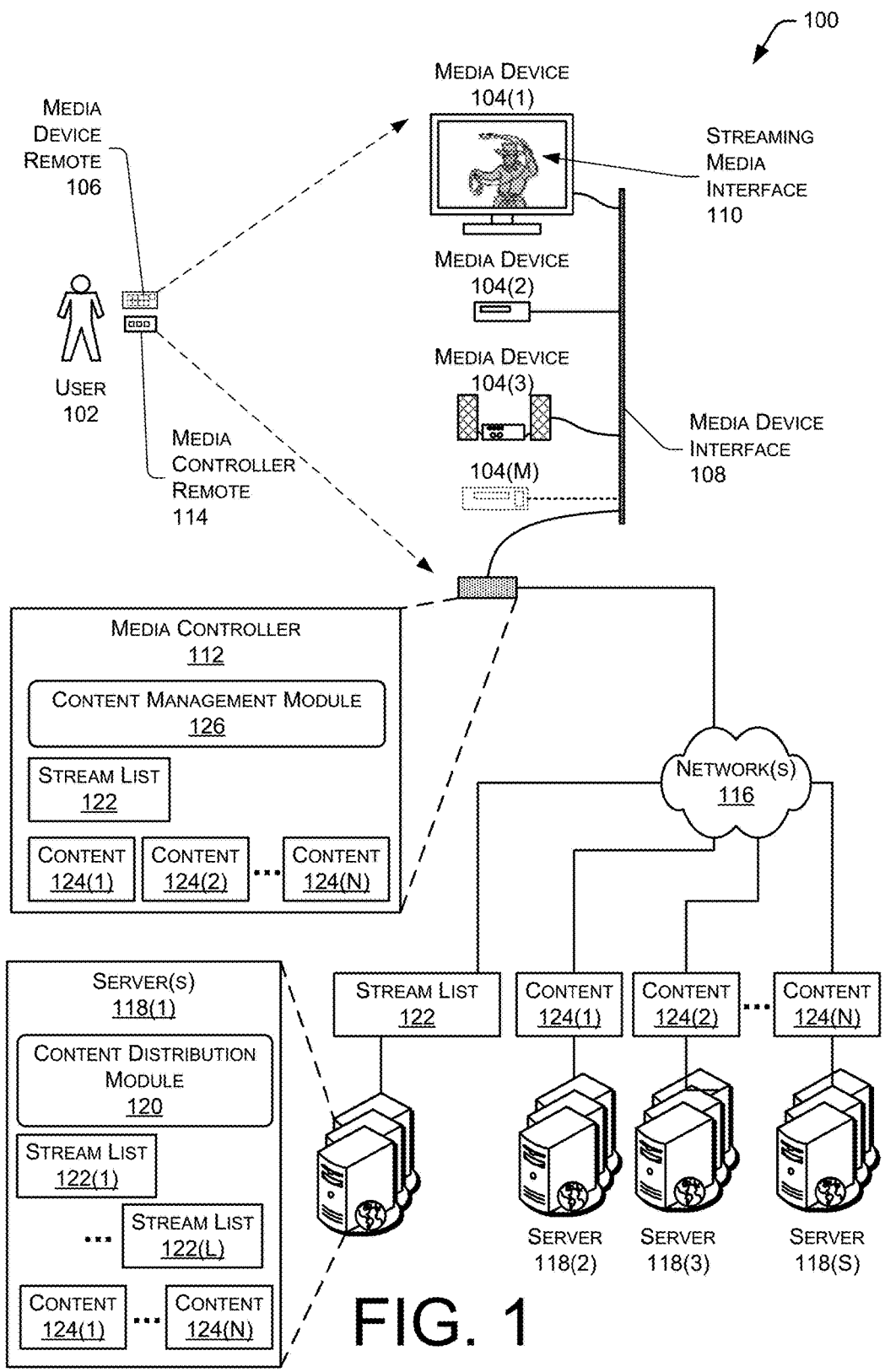
FIG. 1 illustrates a system for presenting streaming content to users.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

A vast and ever growing collection of content is available for users to access. This content may include television programming, audio books, music, movies, and so forth which may be downloaded or streamed to a media device over a data network, such as the Internet. The content may be downloaded or streamed to the media device. Content may also be available from a local media device such as a digital versatile disk ("DVD"), compact disc ("CD"), flash memory, hard disk drive, and so forth.

Streamed or downloaded content traditionally is presented to a user following a series of selections. For example, the user may select a content provider, scroll through several menus showing content, and choose a particular piece of content. However, this involves a significant level of interaction before consumption of the content begins. This level of interaction may be unwelcome for a user who is young, tired, or otherwise would be inconvenienced by the various steps. Additionally, this process of explicit selection reduces spontaneity of the content consumption.

Described herein are devices and methods for presenting streaming content to users. A media device or media controller may have a content management module configured to present streaming content to the user with minimal or no user input. Instead of selecting a content provider and particular titles, the user experiences content delivered without intervention. Several delivered streams of content may be received such that the user may readily switch between streams without selecting a different content provider, title, and so forth and with minimal delay in presentation. For example, the user pressing a "channel up" button on a remote control would experience a change from one stream of content to another. The user may continue to change streams, experiencing different content.

A stream list generated by the media device, media controller, or by a server specifies the content in the delivered streams. The content in the stream list may be selected based at least in part on one or more selection characteristics such as date and time, user demographics, user preferences, location, promotions, content metadata, and so forth. This selection of content may be automatic, manual, or both. For example, the user may build a customized stream comprising episodes of a particular television show, or a watchlist which designates one or more pieces of content for presentation.

The stream list may also include one or more entry points. An entry point specifies where presentation of the content will begin. For example, the entry point in the stream list may specify that the travelogue "Travel to Tahiti" is to begin presentation at fifteen minutes into the content, rather than starting at the beginning. As a result, as the user changes from stream to stream, they may see content in various points of presentation instead of all pieces of content starting at the same time. The entry points may be pre-determined or randomly selected.

In addition to switching between the delivered streams, the user may access a stream guide user interface presenting at least a portion of the contents of the stream list. The user may use this user interface to select a particular piece of content from the stream list.

The overall user experience is improved by presenting the streaming content without explicit user input and allowing the user to easily switch between delivered streams of content. Instead of the complicated selection of content providers and content, the user may simply lean back on their couch and enjoy the content.

Illustrative System

FIG. 1 illustrates a system 100 for presenting content to one or more users for consumption. A single user 102 is shown, however more than one user 102 may consume content at a given time. For example, several users 102 may watch a movie or television show together.

One or more media devices 104 are illustrated. These media devices 104(1), 104(2), . . . , 104(M) may include televisions, display devices, broadcast satellite receivers, broadcast radio receivers, cable television interface boxes, game consoles, digital versatile disk ("DVD") players, Blu-ray™ players, compact disc ("CD") players, in-vehicle entertainment systems, and so forth. For example, as shown here the system 100 comprises a television media device 104(1), a DVD player media device 104(2), a sound system media device 104(3), or other media devices 104(M). The media devices 104 may act as output devices, presenting content to the user. For example, the television media device 104(1) is an output device which presents at least video to the user 102. In another example, the sound system media device 104(3) is an output device which presents audio to the user 102. One or more of these media devices 104 may be configured to provide streamed content. Furthermore, the one or more of the media devices 104 may be configured to operate in conjunction with a media device remote 106.

The media devices 104 may be coupled to one another with a media device interface 108. The media device interface 108 may comprise a high-definition multimedia interface ("HDMI") connection which may use a feature set such as the Consumer Electronics Control ("CEC"), local area network ("LAN"), wireless local area network ("WLAN"), personal area network ("PAN") such as Bluetooth™, and so forth. The media device interface 108 may comprise a wired bus or common set of wireless protocols allowing for the media devices 104 on the media device interface 108 to receive communication from other media devices 104.

The media device interface 108 may transfer data in analog, digital, or combined analog and digital data formats. The data may include image data, audio data, control data, and so forth. For example, the television media device 104(1) may receive a video stream using the media device interface 108 from the DVD player 104(2). Instead of or in addition to content-related information such as audio and video, communication between the media devices 104 may include status information, commands, and so forth.

A media controller 112 may be connected to the one or more media devices 104, such as using one or more of the media device interfaces 108. The media controller 112 may be configured to provide a user interface to the user 102, receive status information about the one or more media devices 104 using the media device interfaces 108, issue commands to one or more of the media devices 104, receive streamed content, and so forth. For example, the media controller 112 may be configured to provide a user interface to the user 102 and provide streamed content to the one or more media devices 104 such as the television 104(1).

The media controller 112 may be configured with one or more input devices configured to accept input from the user 102. For example, the media controller 112 may include a microphone to detect spoken commands from the user 102, or a camera to detect gestures of the user 102.

A media controller remote 114 may be used in conjunction with the media controller 112. The media controller remote 114 is a portable input/output device and may be provided in a variety of form factors such as a tablet, slate, generally rectangular cuboid configured for single-handed use, wand, and so forth. The media controller remote 114 may include one or more buttons or touch sensors to accept as input touches from the user 102, one or more accelerometers or gyroscopes to accept as input motion of the remote or of the user 102, a microphone to accept voice input from speech provided by the user 102, and so forth. The media controller remote 114 is configured to communicate with the media controller 112. In one implementation the wireless connection comprise radio frequency ("RF") signals.

The media controller remote 114 may also be configured to communicate with the one or more media devices 104. This communication may be direct from the media controller remote 114 to the media device 104, or may be via the media controller 112. In some implementations, the media controller remote 114 may comprise one or more infrared emitters configured to generate infrared signals.

The media controller 112 and one or more of the media devices 104 may be configured to couple with communication interfaces to one or more networks 116. The network 116 may comprise one or more private networks, public networks such as the Internet, or a combination of both configured to transfer data between two or more devices.

One or more servers 118(1), 118(2), . . . , 118(S) or other remote devices are coupled to the network 116. The server 118 may provide various services to the media controller 112, the one or more media devices 104, or combinations thereof. A portion of these services may be provided by a content distribution module 120. The content distribution module may be configured to provide one or more stream lists 122(1), 122(2), . . . , 122(L) to the media controller 112, one or more of the media devices 104, or a combination thereof. The content distribution module 120 may also be configured to stream or otherwise transfer one or more pieces of content 124(1), 124(2), . . . , 124(N) to one or more of the media controller 112, the one or more media devices 104, or another server 118. The content 124 may comprise audio, video, and so forth. The content distribution module 120 is discussed below in more detail with regard to FIG. 5.

The stream list 122 is configured to define one or more pieces of content 124, a sequence to present that content 124, and may include an entry point or starting point for the presentation of that convent. The stream list 122 is discussed in more detail below with regard to FIG. 3. The content distribution module 120 of the server 118 may provide one or more stream lists 122 to the media controller 112 or other media device 104.

The servers 118 may provide other services including, but not limited to, administration, storage of content, streaming content, indexing of content, programming, billing, and so forth. The server 118 may provide a web based interface accessible by the user 102. The user 102 access this interface to designate or modify what content is to be presented. The web based interface of the server 118 may also allow for control or configuration of the media controller 112 or the media device 104 over the network 116. For example, while at work the user 102 may use the web based interface to configure the media controller 112 to begin playing back a particular stream list 122.

The server 118 may provide a video stream to the media controller 112 or the media device 104 for presentation. For example, the server 118 may stream the content 124 to the media controller 112 for presentation. The server 118 and various modules are discussed in more detail below with regard to FIG. 5.

The media controller 112 or the media device 104 may comprise a content management module 126. The content management module 126 may use at least a portion of the one or more stream lists 122 to receive streamed content from one or more servers 118, or to present previously stored content. For example, the content management module 126 may access the stream list 122 and initiate streaming of content 124 designated in the stream list 122 from several different servers 118 operated by different content providers. The media controller 112 and the content management module 126 are discussed below in more detail with regard to FIG. 6. The content management module 126 may be configured to present the streams, such as in the user interface described next with regard to FIG. 2.

Figure 2:
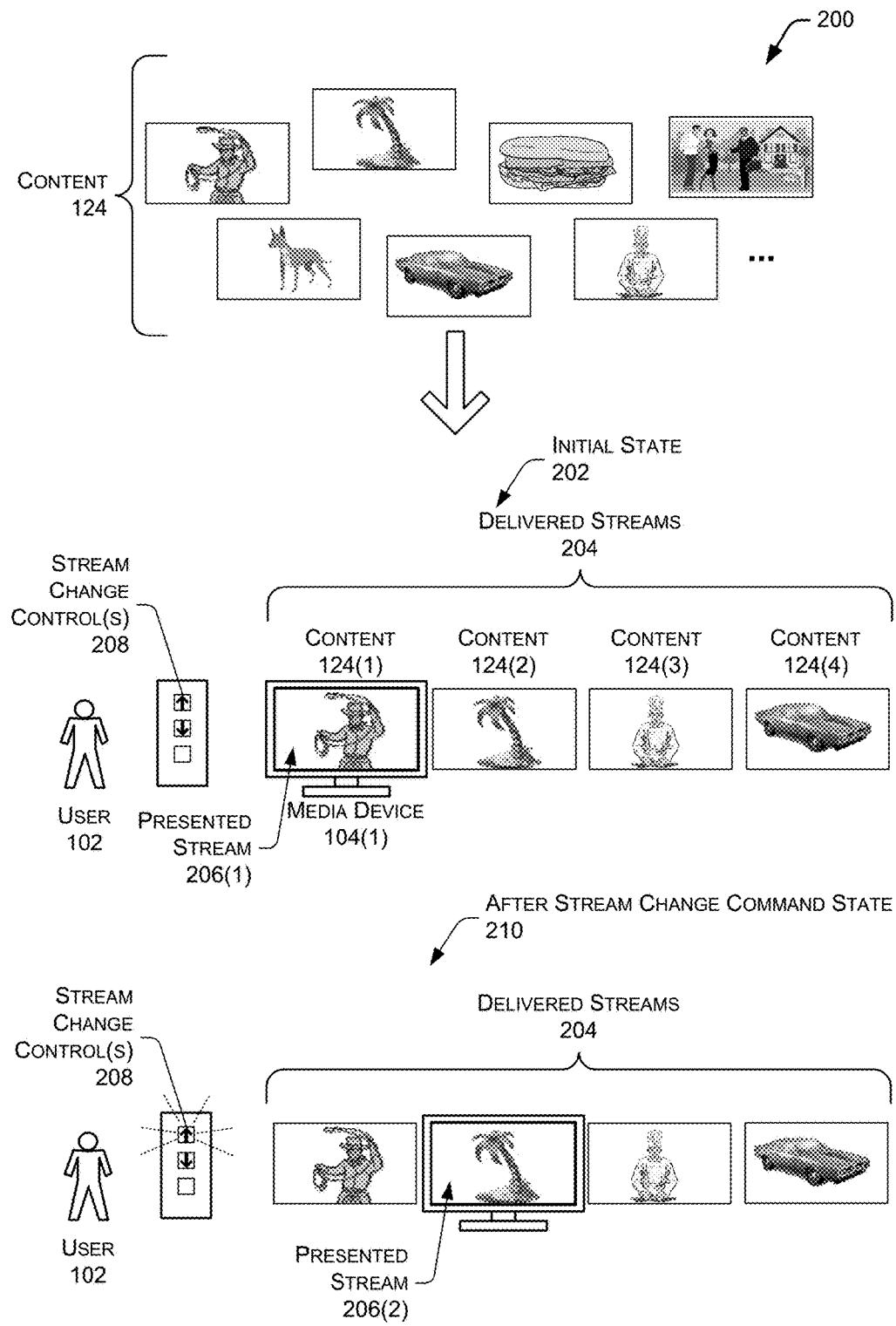
FIG. 2 illustrates presentation of a user interface presenting streamed content designated in a stream list before and after a stream change command.

FIG. 2 illustrates presentation 200 of a user interface presenting streamed content designated in a stream list 122 before and after a stream change command. In this illustration a variety of content 124 is shown. As described above, the catalog of available content is very large, and continues to grow. Traditionally, streamed content has been presented to a user following the user selecting a content provider, selecting a particular piece of content, and so forth. However, this approach may result in an adverse user experience due to the time to select and decisions to be made. Furthermore, this process of explicit selection reduces spontaneity of the content consumption.

In an initial state 202 depicted here, four delivered streams 204 of content specified in the stream list 122 are available at the media controller 112 or the media device 104(1). The media controller 112 or the media device 104(1) is configured to use the stream list 122 to initiate the delivery of the streams 204. Four streams of content are depicted for illustration and not by way of limitation. In other implementations the number of delivered streams 204 may vary.

Of these four streams in this illustration, one presented stream 206(1) of the content 124(1) is presented on the television media device 104(1). The remaining pieces of content 124(2)-(4) are received and available for presentation, but are not yet visible to the user 102. Should the user 102 take no action, the content 124(1) may remain the presented stream 206(1) while the other content 124(2)-(4) continues to be delivered.

The user 102 may wish to see some other piece of content 124, and so may activate a stream change control 208. The stream change control 208 provides an input indicative of the user 104 wishing to change to a different presented stream 206. In some implementations the stream change control 208 may be an "up" or "down" channel button on the media device remote 106 or the media controller remote 114.

At 210 an after stream change command state is depicted. This is the state which occurs after the user activates the stream change control 208. For example, in one implementation the user 102 may utter a verbal command or make a gesture to "change stream" which is recognized by a machine and initiates a change resulting in the content 124(2) being the presented stream 206(2). The delivered streams 204 continues to comprise the content 124(1)-(4), but now the presentation of the presented stream 206(1) of the content 124(1) is discontinued and the second presented stream 206(2) associated with the content 124(2) is presented.

The user 102 may thus shift among the various delivered streams 204. Because the streams have been delivered, they are available with minimal delay and thus the user experience is improved. As the user activates the stream change control 208, new content is presented. The stream list 122 defines what content 124 will be presented in the various streams, and is discussed next in FIG. 3.

In one implementation, the delivery of the streams of content 124(1)-(4) may continue, with all streams progressing in real-time through the stream list 122. A portion of the most recently received data may be buffered, to allow for quick presentation should the user activate the stream change control 208. In another implementation, the presented stream 206 may continue on with realtime delivery while a portion of the remaining delivered streams 204 which are non-presented may be buffered and held pending activation of the stream change control 208. In this implementation, the overall quantity of data transferred over the network 116 may be reduced in situations where the user watches a particular stream for a period of time, as compared to rapidly switching among the different streams.

Figure 3:
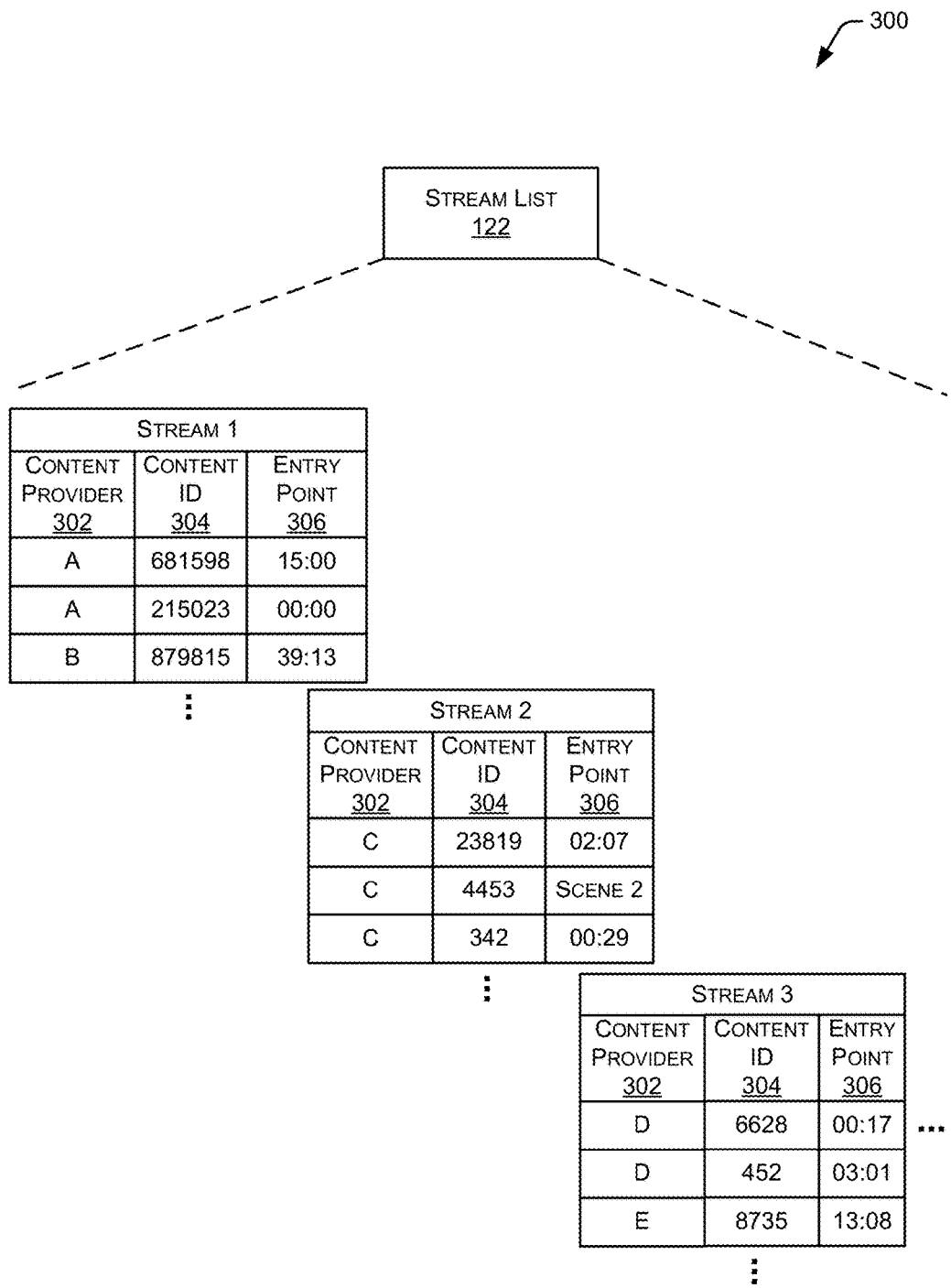
FIG. 3 illustrates a block diagram of the stream list.

FIG. 3 illustrates a block diagram 300 of the stream list 122. One or more of the stream lists 122 may be used by the content distribution module 120, content management module 126, or both to initiate streaming of content 124. The media controller 112 is thus configured to present the content 124 indicated by the stream list 122.

By way of illustration, and not as a limitation, the stream list 122 depicted here has streams 1, 2, and 3. Each stream may contain data such as a content provider 302, a content identifier 304, and an entry point 306.

The content provider 302 designates a particular content provider entity, server 118, and so forth from which the content 124 may be received. This designation may be an identification string, internet address, domain name, hyperlink and so forth. For example, the stream list 122 may designate the content provider as "A Corporation" for a particular piece of the content 124. A stream may be provided from one or more content providers. For example, stream 1 includes two different content providers 302 while stream 2 is from a single content provider 302.

The content selected for the stream list 122 may be based on automated recommendations, personal preferences, user-defined parameters, pre-determined content queues, and so forth. In some implementations, the stream list 122 may include a stream of the currently most popular content for playback.

The content identifier 304 designates a particular piece of content 124. The designation may be an identification string, title, universal product code, item number, and so forth. For example, the content identifier 304 of "215023" may refer to a particular television episode. The content identifier 304 provides a reference such as an identification string, internet address, domain name, hyperlink, pointer, uniform resource identifier, uniform resource locator, and so forth.

The entry point 306 designates a point within the content 124 at which the presented stream 206 begins. For example, an entry point 306 of 0:00 (minutes:seconds) would result in presentation starting at the beginning of the content 124. In comparison, an entry point 306 of 39:13 would result in presentation starting at thirty-nine minutes and thirteen seconds into the content.

The entry point 306 may be used to define a particular point within the content to begin presentation. This point may be defined by data indicating one or more of a time index, chapter, scene, track, byte count, invariant reference number, and so forth. The entry point 306 for a particular piece of content 124 may be determined manually or automatically. Manual determination may comprise a human operator specifying the entry point 306 after reviewing at least a portion of the content. For example, the operator may find a particularly dramatic scene in a television show and designate the start of the scene as the entry point 306.

Automatic determination of the entry point 306 may be based at least in part on one or more of an analysis of the content 124, analysis of user 102 interaction with the content, and so forth. The content distribution module 120 may analyze content to select an entry point 306 for a movie within which particular dialogue, actors, or actions are depicted. For example, the content distribution module 120 may identify a scene in which activity such as a car chase or people running are present, and generate an entry point 306 for the start of that scene.

While the stream list 122 depicted here 300 illustrates a single entry point 306 for each of the pieces of content 124, multiple entry points 306 may be specified for a given piece of content 124. For example, a movie may have several different entry points 306 designated. In one implementation, the entry points 306 may be distributed in a timeline such that as real-time progresses the content management module 126 may jump or "snap" to a particular entry point 306. For example, the content 124(2) may have entry points corresponding to times 3:31, 12:17, and 27:11 in the content 124(2). After watching the content 124(1), at 13:00 minutes since beginning presentation of content, the user 102 initiates a stream change control 208 to the stream showing the content 124(2). Rather than presenting the content 124(2) at time 13:00 minutes corresponding to the real-time elapsed, the media controller 112 may "snap" or jump to the entry point of 12:17 which is closest in time. As a result, the user 102 would see the presentation of the content 124(2) start at 12:17, rather than 13:00.

In another implementation, changes between streams may increment the presentation of content to the next entry point 306. For example, returning to the example of FIG. 2, the user 102 may activate the stream change control 208 to change the presented stream 206(2) from the content 124(2) back to the content 124(1). The presented stream 206(1) may resume with different behaviors. These behaviors include resume, real-time elapsed, or jump to next entry point 306. With the resume behavior, the presented stream 206(1) continues at the point when the user 102 initiated the stream change control 208. With the real-time elapsed behavior, the presented stream 206(1) provides the portion of the content 124(1) corresponding to the amount of real time which has elapsed since the user activates the stream change control 208. With the jump behavior, upon returning to the stream of content 124(1), the presented stream 206(1) begins at the previous or next entry point 306 which is available. Continuing the example, with the jump behavior, upon return to the presented stream 206(1) the user 102 may see a different scene within the movie, regardless of the elapsed real-time between activations of the stream change control 208.

In some implementations, the entry point(s) 306 in the stream list 122 may be configured to avoid "spoiler" or other designation portions of the content 124. For example, where the content 124 comprises a mystery, the entry point 306 may be configured such that the user 102 is not immediately presented with the identity of the criminal.

Furthermore, the entry points 306 may vary depending upon one or more other factors. For example, the entry point 306 for a television show in which the user 102 is an 18 year old male may be a car chase, while in the same television show the entry point 306 for a 55 year old male may be a scene with dialogue.

In some implementations the entry point 306 may be randomly determined. For example, a pseudo-random or random number generator may be used to designate one or more entry points 306.

Figure 4:
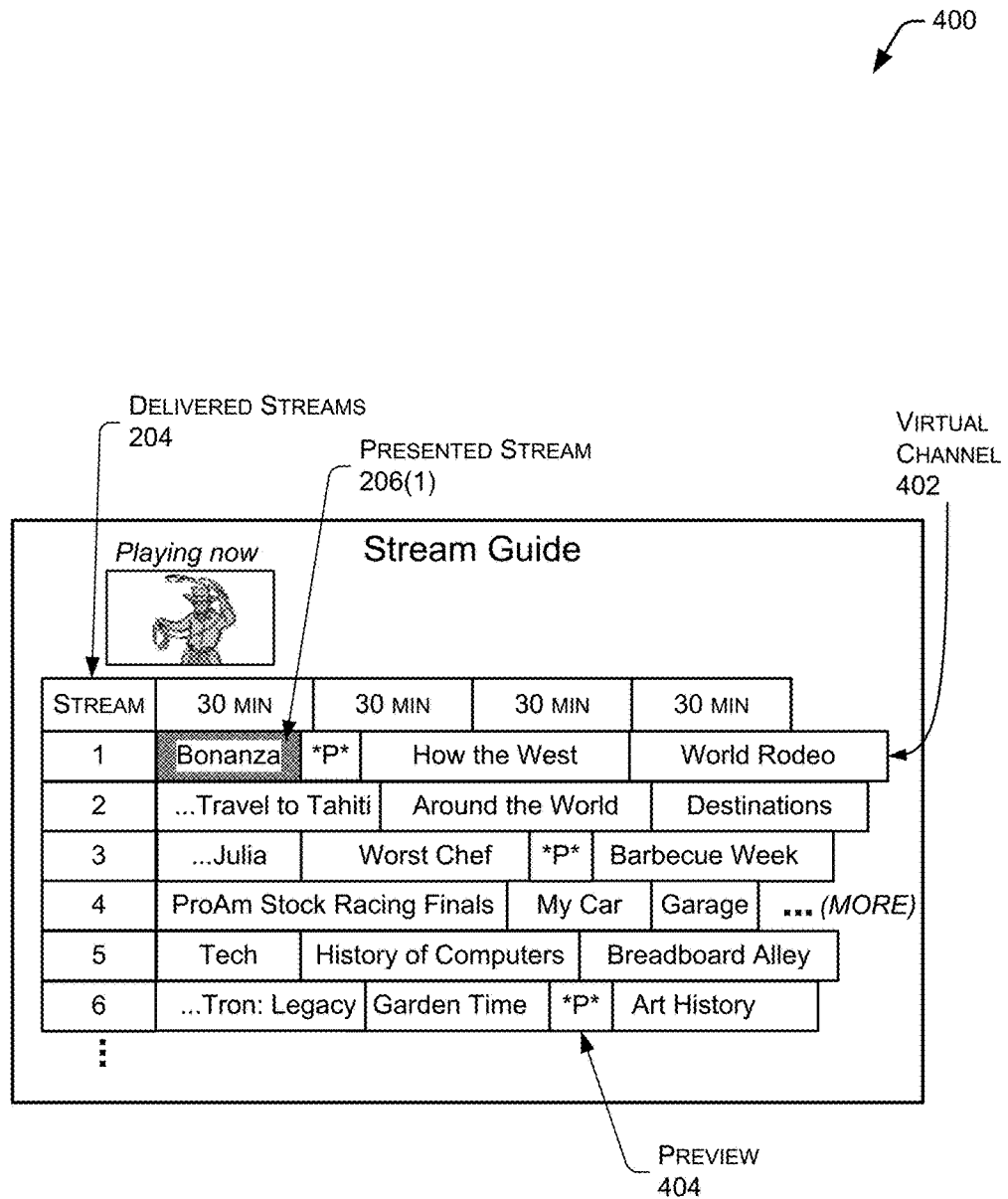
FIG. 4 illustrates a stream guide configured to display information about content.

FIG. 4 illustrates a stream guide 400 configured to display information about content. The presentation of the user interface as described above and illustrated in FIG. 2 allows for simple and easy access to the content 124. In some instances the user 102 may wish to view information about the stream list 122, the delivered streams 204, or both. The content management module 126, the content distribution module 120, or a combination of these may be used to generate and present the stream guide 400.

The stream guide 400 presents this information to the user 102. In this illustration, the stream guide 400 presents a series of virtual channels 402, each virtual channel corresponding to different delivered streams 204. The currently presented stream 206(1) is indicated with shading here. Also depicted are the various other pieces of content 124 which are in the stream list 122.

The stream list 122 may include previews 404 of content 124, such as available for an additional fee or which are soon to be released. In some implementations, a given virtual channel 402 or stream may be configured to provide a series of previews 404. Generation of the stream list 122 is discussed below in more detail below.

The user 102 may navigate the stream guide 400 to select different content 124 for presentation. Because the content 124 is delivered from the server 118, the user need not wait for a particular time to view content. For example, the user 102 may choose to view the television program "Barbecue Week" which is scheduled for presentation later by stream 3. By navigating the stream guide 400 interface, such as with the media controller remote 114 or the media device remote 106, the user may select "Barbecue Week" and begin watching immediately. After selection, when next accessed by the user 102, the stream guide 400 may appear to have scrolled or shifted to the right, increasing in time, and presenting additional content going forward, regardless of the elapsed time since the selection of the content 124 for presentation.

Each of the virtual channels 402 are derived from the stream list 122. The different virtual channels 402 may be configured to provide content in a particular genre. For example, stream 1 provides western content 124 while stream 2 contains travel-related content. Stream 3 has a series of cooking and food related while stream 4 is focused on automotive content 124 and stream 5 is technology related programming. Stream 6 is a mixed virtual channel 402, including a movie, garden show, art history, and so forth.

As described above with regard to the entry points 306 of FIG. 3, presentation of the content 124 may begin at different points in the content. This is illustrated here in the stream guide 400. For example, streams 3 and 6 are listed with content 124 starting at a point other than the beginning.

In some implementations, the user 102 may be provided with a user interface to generate a custom virtual channel 402. For example, the user 102 may create a "British Comedy" channel which includes content 124 associated with this genre or theme.

The stream guide 400 may also present virtual channels 402 which are designated in the stream list 122 but for which streaming has not yet been initiated. For example, the user 102 may scroll down the list to see the virtual channel 402 associated with stream 36 which has not yet begun streaming, compared to streams 1-6 which are in the delivered streams 204. The content management module 126 may be configured to determine which streams to initiate delivery, maintain delivery, or terminate delivery of. This determination may be based at least in part on the relative position of the delivered streams 204 to one another, available network bandwidth, elapsed time since last activation of the stream change controls 208, and so forth. For example, relative to a particular virtual channel 402(5) which is providing the presented stream 206(5), the content 124(3)-124(7) may be streamed while other streams such as 402(1), (2), and (8) are not.

Figure 5:
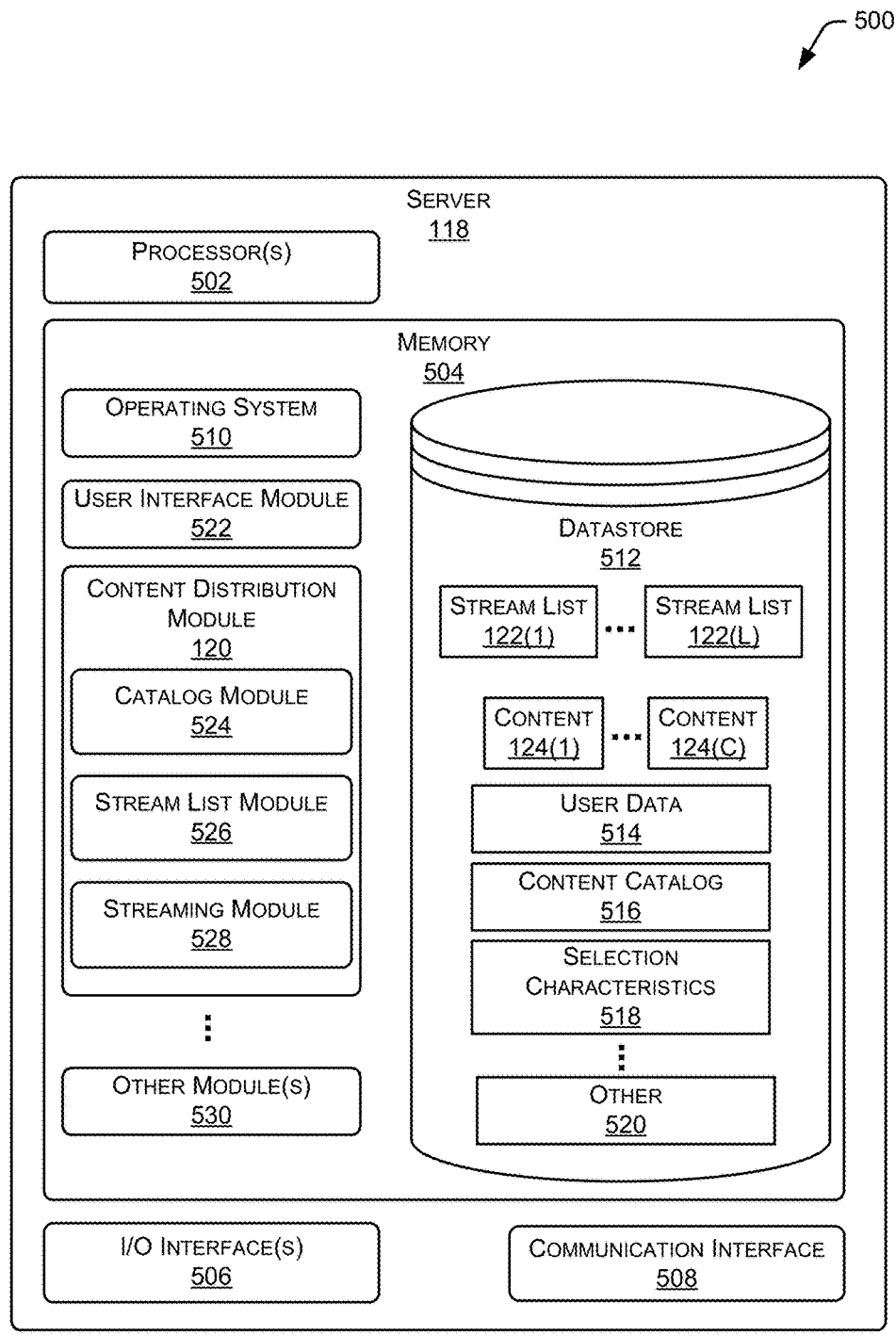
FIG. 5 illustrates a block diagram of a server configured with a content distribution module configured to generate a stream list.

FIG. 5 illustrates a block diagram 500 of the server 118 configured with the content distribution module 120. The server 118 may comprise one or more processors 502, one or more memories 504, one or more input/output ("I/O") interfaces 506, and one or more communication interfaces 508.

The processor 502 may comprise one or more cores and is configured to access and execute at least in part instructions stored in the one or more memories 504. The one or more memories 504 comprise one or more computer-readable storage media ("CRSM"). The one or more memories 504 may include, but are not limited to, random access memory ("RAM"), flash RAM, magnetic media, optical media, and so forth. The one or more memories 504 may be volatile in that information is retained while providing power or non-volatile in that information is retained without providing power.

The one or more I/O interfaces 506 allow for coupling devices to the server 118. The I/O interfaces 506 may comprise inter-integrated circuit ("I2C"), serial peripheral interface bus ("SPI"), universal serial bus ("USB"), RS-232, RS-432, Fibre Channel, and so forth.

The one or more communication interfaces 508 provide for the transfer of data between the server 118 and other devices such as the media controller 112, other servers 118, and so forth. The communication interfaces 508 may be configured to connect the server 118 wired or wirelessly to one or more networks 116. These networks may include a wired local area network, wireless local area network, wireless wide area network, and so forth.

In other implementations other devices or components may be coupled to or incorporated within the server 118. For example, digital rights management ("DRM") devices may be provided to control access to content.

The one or more memories 504 may store code or program instructions for execution by the processor 502 to perform certain actions or functions. In some implementations at least a portion of the instructions may be stored in external memory accessible to the server 118, such as on another server 118.

These instructions in the one or more memories 504 may include an operating system 510. The operating system 510 is configured to manage hardware resources such as the I/O interfaces 506 and provide various services to applications executing on the processor 502.

The one or more memories 504 may also store a datastore 512 containing information. This information may include one or more stream lists 122, at least a portion of content 124, user data 514, one or more content catalogs 516, selection characteristics 518, and other data 520. The datastore 512 may comprise a database, flat file, linked list, or other data structure.

The user data 514 comprises information about the user 102. This may include demographic data associated with the user 102, user-queued content, preferred content categories, and so forth. For example, the user data 514 may include information that the user 102 is a male age 41 who has indicated a preference for science fiction and cooking. The user data 514 may include additional data such as purchase history for non-content items. For example, the user data 514 may include information that the user 102 frequently purchases cooking equipment and cookbooks. The user data 514 may be used to select content for inclusion in the stream list 122.

The content catalog 516 comprises information about the content 124. This information may include content metadata, content availability, content cost, source address, and so forth. The content catalog 516 may comprise information aggregated from a plurality of servers 118 or content providers.

The selection characteristics 518 are one or more attributes which are indicative of a consumption environment within which the user 102 may consume the content 124. The selection characteristics 518 may be used to determine pieces of content 124 for inclusion in the stream list 122. The consumption environment is based on information about the devices, users, preferences, promotions, content, and so forth associated with consuming content. The selection characteristics are discussed in more detail below with regard to FIG. 6.

Other data 520 may also be stored in the datastore 512, such as digital rights management keys, billing information, and so forth. While the datastore 512 is depicted as residing in the memory 504 of the server 118, in some implementations at least a portion of the data in the datastore 512 may be stored on or distributed across one or more other servers 118 or other devices.

A user interface module 522 is configured to provide a user interface for presentation to the user 102. For example, the user interface module 522 may provide one or more web pages configured to accept input from the user 102. For example, the user interface module 522 may be configured to provide a graphical user interface in which the user can enter one or more selection characteristics 518.

The memory 504 may store the content distribution module 120 which may include a catalog module 524, a stream list module 526, and a streaming module 528. The catalog module 524 is configured to maintain or access the content catalog 516. The catalog module 524 may retrieve information from other servers 118 or other devices and aggregate this information.

The stream list module 526 is configured to generate one or more of the stream lists 122(1)-(L). The stream list module 526 may determine content for inclusion based at least in part on one or more of the selection characteristics 518. For example, where the selection characteristics 518 include user-queued content, the stream list module 526 may select one or more of the pieces of content 124 in the user's queue. Determination of the stream list 122 is discussed in more detail below with regard to FIG. 6 and the selection characteristics 518.

The streaming module 528 is configured to provide the content 124 by streaming or otherwise transferring one or more pieces of content 124(1), 124(2), . . . , 124(N) to one or more of the media controller 112, the one or more media devices 104, or another server 118. The streaming module 528 may be configured to begin streaming the content 124 based at least in part on the stream list 122.

Other modules 530 may also be stored in the memory 504. For example, a billing module may be configured to accept and process payment information to provide access to content 124 to the user 102.

Figure 6:
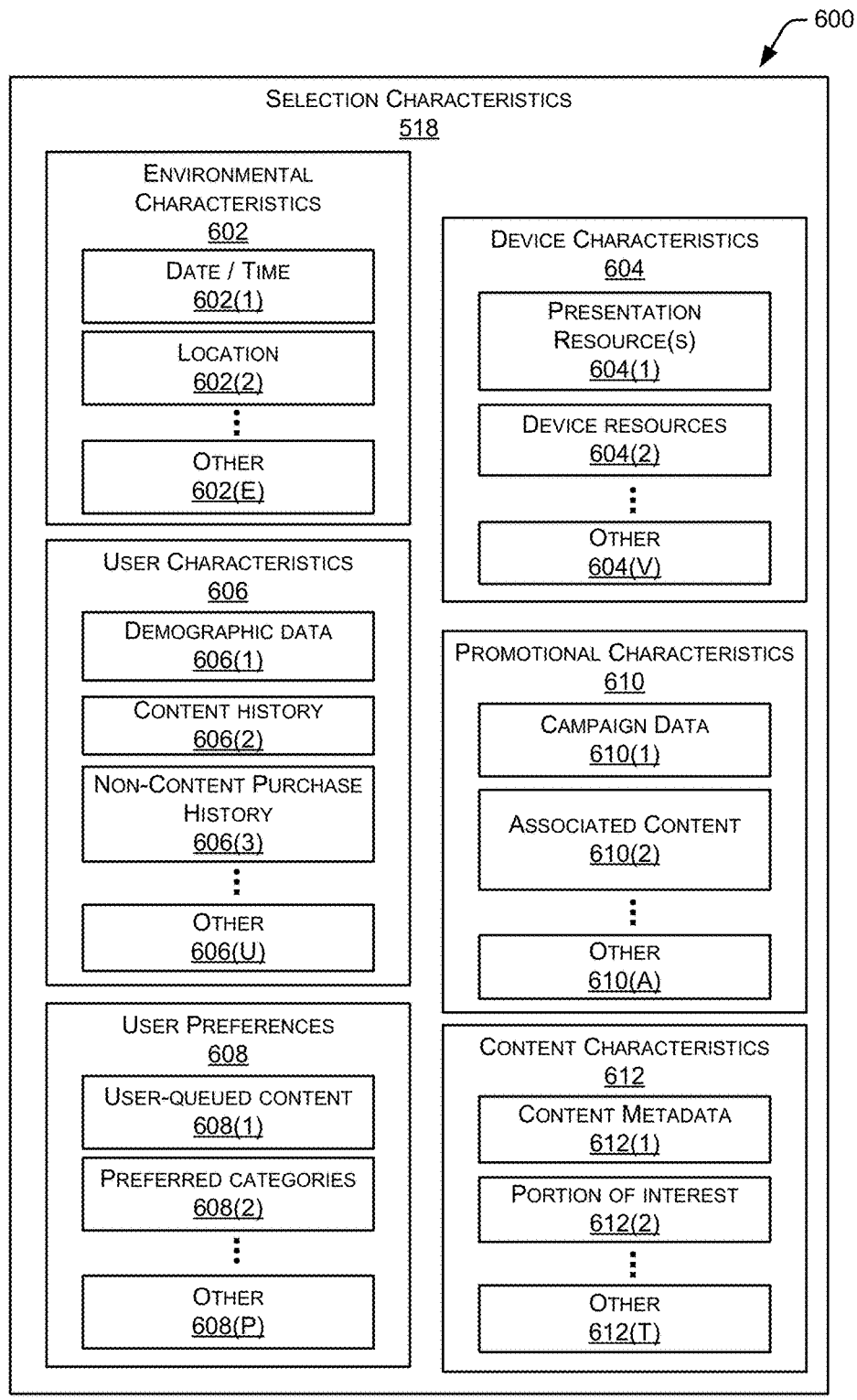
FIG. 6 illustrates a block diagram of selection characteristics used by the content distribution module to generate the stream list.

FIG. 6 illustrates a block diagram 600 of the selection characteristics 518 indicative of the consumption environment which may be used by the stream list module 526 to generate the stream list 122. The selection characteristics 518 describe the consumption environment within which the user 102 consumes content 124. The selection characteristics 518 may include environmental characteristics 602, device characteristics 604, user characteristics 606, user preferences 608, promotional characteristics 610, content characteristics 612, and so forth.

The environmental characteristics 602 describe aspects of the environment in which the media controller 112 or media device 104 is operated. These characteristics may include a date/time 602(1), location 602(2), and so forth. For example, the stream list 122 may be varied based at least in part on the date/time 602(1) of the media controller 112 such that the stream list 122 provided in the morning differs from that of the evening. In another example, the stream list 122 provided for the media device 104 in Miami, Fla. may differ from that provided to the media device 104 in Seattle, Wash. Other 602(E) environmental characteristics 602 such as number of users present, ambient light level, local weather, and so forth may be used to generate the stream list 122.

The device characteristics 604 describe attributes associated with the media controller 112 or media device 104. These may include one or more of presentation resources 604(1), device resources 604(2), and so forth. The presentation resources 604(1) may include information about display resolution, three-dimensional display capability, audio system functions supported, and so forth. For example, the stream list 122 may omit content 124 which is only available in a three-dimensional ("3D") format when the display does not support 3D presentation.

The device resources 604(2) may include available memory, network bandwidth available to stream the content 124, and so forth. For example, the content list 124 may be adjusted to include lower-resolution content 124 when the network bandwidth available for streaming is below a predetermined threshold. Other 604(V) device characteristics such as availability of digital rights management hardware and so forth may also be used to select content for the stream list 122.

The user characteristics 606 provide information about the user 102. This may include demographic data 606(1) such as age, gender, occupation, place of residence, and so forth. For example, the stream list 122 generated for a male user with an occupation of mechanic may include more automotive content.

Content history 606(2) such as what content 124 has previously been consumed by the user 102 may be considered in the selection of the content 124 from the content catalog 516. For example, where the user 102 has watched more western-themed movies, additional western-themed content 124 may be included in the stream list 122.

Non-content purchase history 606(3) includes purchase information about things other than content 124 which have been purchased or otherwise acquired by the user 102. For example, a purchase of a stuffed toy associated with a particular cartoon series may be used to select the cartoon series for inclusion in the stream list 122.

Other 606(U) user characteristics may also be considered in the generation of the stream list 122, such as frequency of content consumption, family affiliations, social network affiliations, related users 102 such as spouses or children, and so forth. For example, the selection may be based at least in part on content history 606(2) of friends indicated in a social network.

The user preferences 608 provide information which the user 102 has entered. These may include user-queued content 608(1), preferred categories 608(2), and so forth. The user-queued content 608(1) comprises the pieces of content 124 which the user 102 has specified as being of interest to watch. For example, the user 102 may have added a particular television episode or entire series to a queue for later watching. The preferred categories 608(2) include information such as a particular genre, theme, and so forth. For example, the user 102 may specify preferred categories 608(2) of science fiction, gardening, aviation, and documentaries. Other 608(P) user preferences may also be used such as preferences for particular content at specific times, favorite streamed television channels, user ratings of content, and so forth. For example, the user 102 may specify a preference to see child-oriented programming from 6 a.m. to 9 a.m.

The promotional characteristics 610 provide information about promotions for content 124, goods, or services which may be of interest to the user 102. The promotional characteristics 610 may be used to select previews 404, advertisements, and so forth. The promotional characteristics 610 may include campaign data 610(1), associated content 610(2), and so forth. The campaign data 610(1) includes information such as dates when a preview is scheduled and available for presentation, when an advertisement is valid for, and so forth. The associated content 610(2) includes content 124 which is related to the content 124, goods, or services in the promotion. For example, where the advertisement is for auto parts the associated content 610(2) may be television shows about auto repair. Using these promotional characteristics 610, the content distribution module 120 may generate a stream list 122 which includes the television shows about auto repair and the advertisement for auto parts.

The content distribution module 120 may also use the content characteristics 612 to generate the stream list 122. The content characteristics 612 may include content metadata 612(1), portion of interest 612(2), and so forth. The content metadata 612(1) provides information about the content 124, such as genre, title, actors, producer, screenwriter, artist, lyrics, duration, spoken language, dubbed languages, subtitle languages, and so forth. For example, the stream list module 526 may be configured to include content 124 having content metadata 612(1) corresponding to the preferred categories 608(2).

The portions of interest 612(2) are the points or sections within the content 124 which are of particular interest for inclusion or omission during presentation of the content 124. For example, a portion of particular interest may be a particularly captivating scene in a movie. In comparison, a portion for omission may be a spoiler or section such as the denouement of a film or audio program. The stream list module 526 may be configured to select the entry point 306 associated with the captivating scene or may be configured to avoid initially presenting the denouement during presentation of the presented stream 206.

Other 612(T) content characteristics may be used as well. In one implementation, popularity of content 124 with regard to consumption by other users may be considered when generating the stream list 122. For example, the content 124 which has been viewed by a pre-determined threshold number of users may be included in the stream list 122.

In some implementations, different selection characteristics 518 may be assigned different weights by the stream list module 526 for generation of the stream list 122. For example, the user characteristics 606 may be weighted heavily while the promotional characteristics 610 are weighted lightly.

The description of selection characteristics 518 is provided by way of illustration and not as a limitation. Other selection characteristics may be used instead or, or in addition to, those described above. Furthermore, various combinations of the above selection characteristics 518 may be used to generate the stream list 122. For example, the campaign data 610(1) for a preview of an action science-fiction feature film may be presented to the user 102 with demographic data 606(1) associated with that feature film and who has selected science fiction as a preferred category 608(2).

Figure 7:
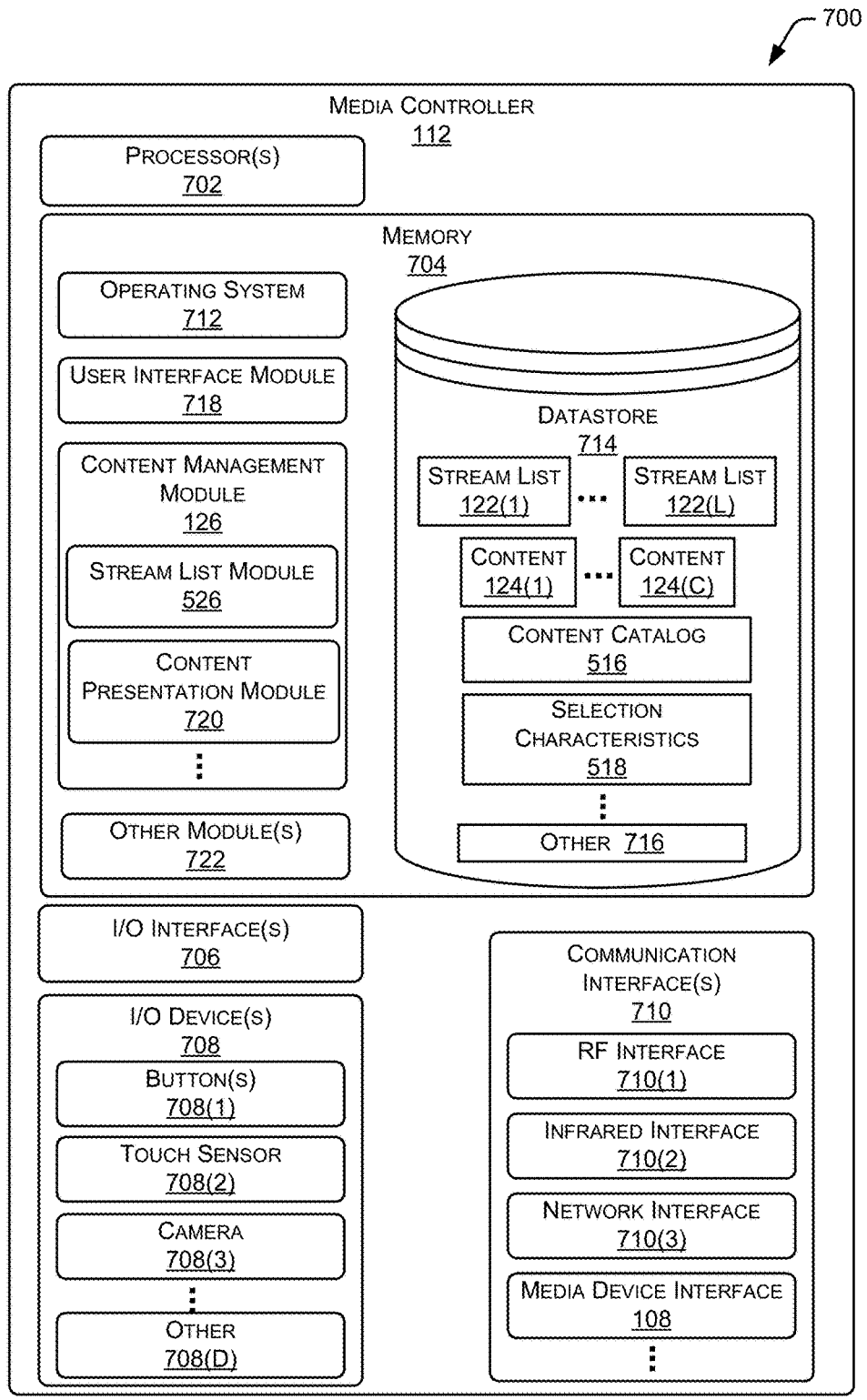
FIG. 7 illustrates a block diagram of a media controller configured with a content presentation module configured to present streamed content described in the stream list.

FIG. 7 illustrates a block diagram 700 of a media controller configured with a content presentation module configured to present streamed content described in the stream list. In some implementations the media device 104 may have the same or a similar configuration. The media controller 112 may comprise one or more processors 702, one or more memories 704, one or more input/output ("I/O")

interfaces 706, one or more I/O devices 708, and one or more communication interfaces 710.

The processor 702 may comprise one or more cores and is configured to access and execute at least in part instructions stored in the one or more memories 704. The one or more memories 704 comprise one or more computer-readable storage media ("CRSM") such as described above.

The one or more I/O interfaces 706, similar to those described above, allow for coupling devices to the server 118. The I/O interfaces 706 may comprise inter-integrated circuit ("I2C"), serial peripheral interface bus ("SPI"), universal serial bus ("USB"), RS-232, RS-432, and so forth. The I/O devices may include buttons 708(1) such as in keypads or keyboards, or touch sensors 708(2). The buttons 708(1) may include mechanical buttons, softkeys, keys with integrated displays, and so forth. The touch sensors 708(2) may comprise interpolating force sensing resistor ("IFSR") arrays, capacitive sensors, optical touch sensors, and so forth. A camera 708(3) may be provided to receive information such as user gestures, acquire images of the user 102 for user recognition, and so forth. Other I/O devices 708(D) may also be provided, such as a microphone configured to receive audio input such as speech from the user 102.

The one or more communication interfaces 710 provide for the transfer of data between the media controller 112 and other devices such as the media controller remote 114, the servers 118, the media devices 104, and so forth. The communication interfaces 710 may include, but are not limited to, PANs, wired local area networks ("LANs"), wireless local area networks ("WLANs"), wireless wide area networks ("WWANs"), and so forth. As shown here, the communication interfaces 710 may comprise one or more RF interfaces 710(1), one or more infrared interfaces 710(2), one or more network interfaces 710(3), one or more media device interfaces 108, one or more other interfaces, or a combination thereof.

The RF interface 710(1) may comprise a radio transmitter, radio receiver, or radio transceiver. The RF interface 710(1) may be compliant with one or more standard protocols, such as the Bluetooth™ PAN. The infrared interface 710(2) may comprise an infrared transmitter, infrared receiver, or an infrared transceiver. In some implementations the infrared interface 710(2) of the media controller 112 may consist of the infrared receiver and omit the infrared transmitter. In some implementations, an infrared transmitter in the media controller remote 114 may be used to generate infrared signals for controlling one or more of the media devices 104.

The network interface 710(3) may be configured to connect the media controller 112 wired or wirelessly to one or more networks 116. These networks may include a LAN, WAN, WLAN, WWAN, and so forth. For example, the network interface 710(3) may comprise a transceiver and other devices configured to be compliant with the Institute of Electrical and Electronics Engineers ("IEEE") 802.11 standards. The network interface 710(3) may include a transceiver and other devices configured to be compliant with WWAN networks provided by one or more cellular carriers. For example, the network interface 710(3) may be configured to cellular data networks such as those based on the IEEE 802.16 standards such as WiMAX technology.

The communication interface 710 of the media controller 112 may also comprise the media device interface 108 as described above. For example, several HDMI connections may be supported to allow coupling to one or more of the media devices 104 such as the television media device 104(1) to present a graphical user interface, or the sound system media device 104(3) to present an audible user interface.

In other implementations other devices or components may be coupled to or incorporated within the media controller 112. For example, digital rights management ("DRM") devices may be provided to control access to content.

The one or more memories 704 may store code or program instructions for execution by the processor 702 to perform certain actions or functions. In some implementations at least a portion of the instructions may be stored in external memory accessible to the media controller 112, such as on the server 118 or one of the media devices 104.

These instructions in the one or more memories 704 may include an operating system 712. The operating system 712 is configured to manage hardware resources such as the I/O interfaces 706 and provide various services to applications executing on the processor 702.

The one or more memories 704 may also store a datastore 714 containing information. This information may include one or more stream lists 122, at least a portion of content 124, the one or more content catalogs 516, the selection characteristics 518, and other data 716 such as the user data 514 for a particular user 102. The datastore 714 may comprise a database, flat file, linked list, or other data structure.

Other data 716 may also be stored in the datastore 714, such as digital rights management keys, billing information, and so forth. While the datastore 714 is depicted as residing in the memory 704 of the media controller 112, in some implementations at least a portion of the data in the datastore 714 may be stored on or distributed across one or more servers 118 or other devices such as the media devices 104 or other media controllers 112.

A user interface module 718 is configured to provide a user interface such as the streaming media interface 110 for presentation to the user 102. For example, the user interface module 718 may generate images of a graphical user interface comprising elements such as menus and prompts for presentation on a display such as the television media device 104(1). In another example, the user interface module 718 may generate audible prompts for presentation using the sound system media device 104(3). The user interface module 718 may also be configured to accept input from the user 102. For example, the user interface module 718 may be configured to interpret input from the media controller remote 114 as selecting a particular element of the graphical user interface.

The user interface module 718 may be configured to process activation of the stream change control 208 to change the presented stream 206. The user interface module 718 may also be configured to present the stream guide 400 as described above and accept user input responsive to the stream guide 400, such as selecting a particular stream or piece of content for presentation.

The memory 704 may store the content management module 126 which may include a stream list module 526 and a content presentation module 720. As described above, the stream list module 526 may be configured to generate the stream list 122, such as described above with respect to FIG. 5. In some implementations the stream list module 526 may be configured to receive at least a portion of the stream list 122 from the content distribution module 120 executing on the server 118.

The content presentation module 720 is configured to initiate or work in conjunction with the servers 118 providing the delivered streams to receive and prepare the streams for presentation to the user 102. For example, the content presentation module 720 may be configured to transcode and send stream data along the media device interface 108 from the media controller 112 to the media device 104.

Other modules 722 may also be stored in the memory 704. For example, a digital rights management module may be configured to provide access to streamed content 124.

Illustrative Processes

Figure 8:
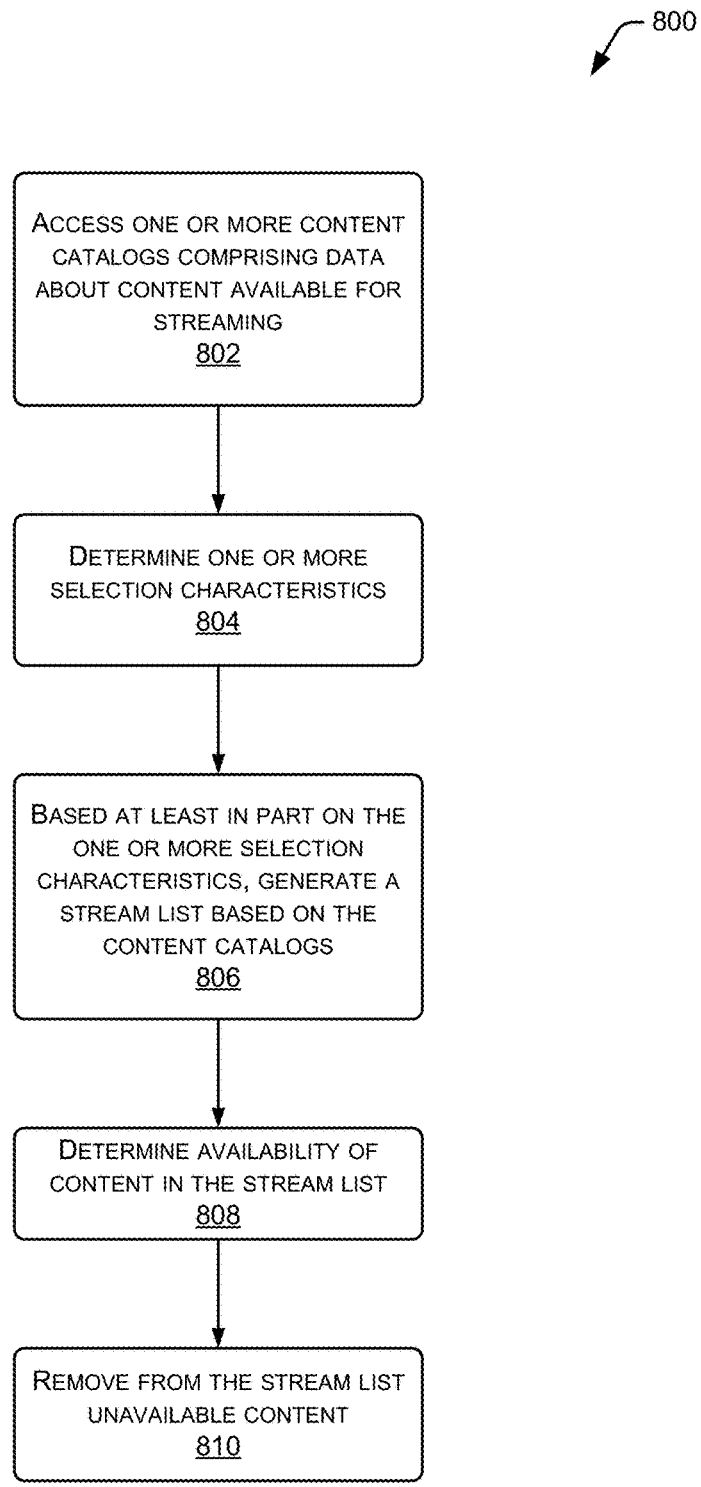
FIG. 8 illustrates a process for generating the stream list.

FIG. 8 illustrates a process 800 for generating the stream list. The process may be implemented at least in part by one or more of the content distribution module 120 or the content management module 126, and may be executed on one or more of the media controller 112, the media device 104, or the server 118.

Block 802 accesses one or more content catalogs 516. The one or more content catalogs comprise data about pieces of content available for delivery using a network connection. In some implementations the content catalogs 516 may be stored on servers 118 associated with different content providers. The one or more content catalogs 516 may be associated with a plurality of content providers. The content 124 may include previews of content 124, such as available for an additional fee or which are soon to be released.

Block 804 determines one or more selection characteristics 518. As also described above, the selection characteristics 518 comprise one or more attributes indicative of a consumption environment within which the user 102 is consuming or may consume content 124. For example, the stream list module 526 may query for the device characteristics 604 to determine what content 124 may be presented. The one or more selection characteristics 518 as described above may comprise one or more of date/time 602(1), demographic data associated with a user 606(1), user-queued content 608(1), preferred content categories 608(2), content metadata 612(1). In some implementations this determination may include identifying one or more users 102.

Block 806, based at least in part on the one or more selection characteristics 518, generates a stream list 122 based on the one or more content catalogs 516, wherein the stream list 122 comprises references to the pieces of content 124. The references may include links, pointers, uniform resource identifiers, uniform resource locators, content identifiers, and so forth. For example, as shown in FIG. 3, stream 1 may include content with different content identifiers 304 of 681598, 215023, and so forth. As described above with regard to FIG. 3, the stream list 122 may include one or more entry points 306 for one or more of the pieces of content 124, with the entry point 306 configured to designated a point within the content 124 to begin presentation. The stream list may comprise references to pieces of content from the plurality of content providers.

In some implementations, the process may proceed to block 808 which determines one or more pieces of content 124 in the stream list 122 are unavailable content. For example, content providers associated with the different content may be queried to confirm access to the content and facilities to deliver the content at that time. In some implementations, block 808 may periodically check for availability, and when unavailable content is determined proceed to block 810.

Block 810 may remove from the stream list 122 the unavailable content. For example, content which the user 102 does not have access at the content provider may be omitted. This prevents attempted presentation failures which may result in a less-than ideal user experience.

Figure 9:
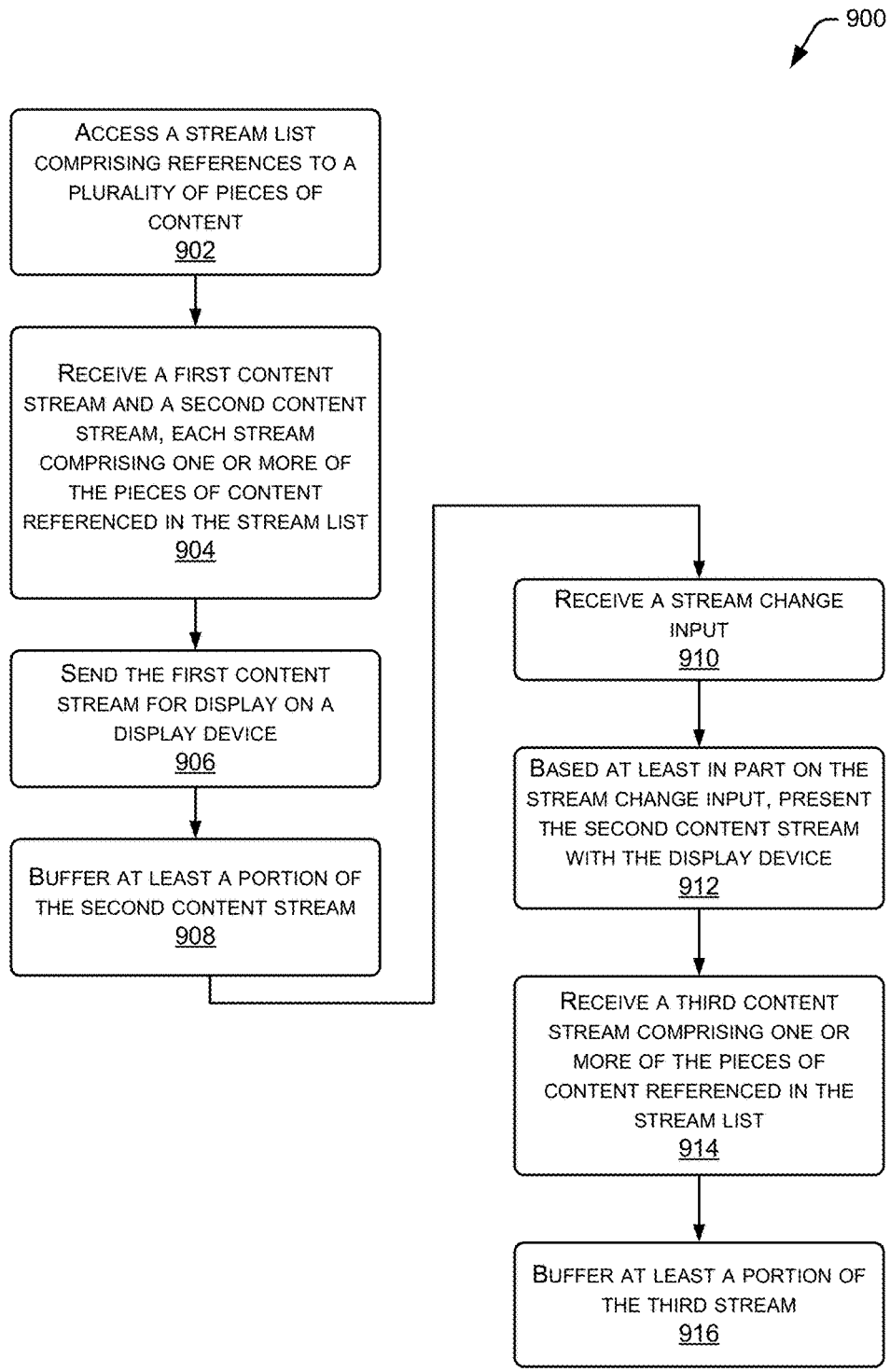
FIG. 9 illustrates a process for presenting streamed content designated in the stream list.

FIG. 9 illustrates a process 900 for presenting streamed content designated in the stream list. The process may be implemented at least in part by the content management module 126, and may be executed at least in part on one or more of the media controller 112, the media device 104, or the server 118.

Block 902 accesses one or more stream lists 122 comprising references to a plurality of pieces of content 124 available by streaming over a network connection. The plurality of pieces of content 124 may comprise video content, audio content, or other content such as audiobooks, text books, and so forth.

The stream list 122 as described above with respect to FIG. 3 illustrates that the stream list 122 may include a designation of the content provider 302, the content identifier 304, and one or more entry points 306 associated with the content. As described above, the one or more entry points 306 specify a start point within the piece of content for presentation of the content. As also described above, the one or more stream lists 122 may comprise data received from one or more devices using the network connection such as the media controller 112, the media device 104, or the server 118, and each stream list 122 may also specify content from one or more different content providers or servers 118.

Block 904 receives a first content stream and a second content stream, each stream comprising one or more of the pieces of content 124 referenced in the stream list 122. For example, as described above with regard to FIGS. 2-4, the media controller 112 or the media device 104 may receive the delivered streams 204 comprising the content 124(1)-(4). By receiving the plurality of streams, or at least a portion thereof, when the user activates the stream change control 208, the presented stream 206 is presented to the user quickly. In some implementations, at least a portion of the plurality of streams may be received from a plurality of different content providers or servers 118.

In some implementations, prior to block 904's receipt of the streams, requests may be sent to one or more content providers indicated in the stream list to begin streaming the content 124. For example, for the streams 1, 2, and 3 discussed above with respect to FIG. 3, requests may be sent to content providers A, C, and D to begin streaming the pieces of content referenced by the content identifiers 304 of 681598, 23819, and 6628, respectively.

Block 906 sends the first content stream for display on a display device, such as the television media device 104(1). In some implementations, the first content stream may be sent from the media controller 114 using the media device interface 108. Block 908 buffers at least a portion of the second content stream, such as in CRSM. Continuing the example from FIGS. 2-4, the presented stream 206(1) may comprise the content 124(1), while the remaining content 124(2)-(4) is streamed to the device and at least a portion thereof is buffered but not necessarily presented to the user 102. As described above, in some implementations the content streams may be received from a plurality of content providers. For example, here the first content stream may be received from a first content provider and the second content stream may be received from a second content provider.

Block 910 receives a stream change input 208. The receiving the stream change input 208 may comprise processing a signal indicative of a change of television channel received from a remote control. For example, the user 102 may activate a "channel up" or "channel down" control on the media device remote 106 or the media controller remote 114.

In some implementations the streaming media interface 110 may be configured to change the stream without intervention, and suspend these automatic changes when user input is received. This provides an "automatic browse" function.

When no stream change input 208 is received, in some implementations the streaming media interface 110 may continue to present the current stream. After a pre-determined period of time, streaming of the other content may be discontinued. For example, the pre-determined period of time may be eight minutes, and after the user 102 has been watching the presented stream 206(1) of the same content 124(1) for eight minutes, the streaming of the content 124(2)-(4) may be discontinued.

When the streaming of the other content present in the stream list 122 has been suspended, the streaming may be configured to resume as the currently watched content nears a particular point, such as one of the entry points 306 or the end of the content 124. For example, five minutes before the end of the television show being watched by the user 102, the streaming for the other content 124 designated in the stream list 122 may resume such that upon conclusion and the user activation of the stream change control 208 the other content is promptly available for presentation.

In some implementations, should a piece of content 124 become unavailable, the presentation may skip to the next available piece of content 124 in that stream. Should the stream become unavailable, the presentation may skip to another stream.

Block 912, based at least in part on the stream change input 208, presents the second content stream, such as on the display on the media device 104(1). Block 914 receives a third content stream comprising one or more of the pieces of content referenced in the stream list 122. For example, with the user changing to the presented stream 206(2) for the content 124(2), the content management module 126 may initiate streaming of the content 124(5). In some implementations the first content stream may be discontinued. For example, the stream for the content 124(1) may be stopped. Block 916 buffers at least a portion of the third stream. Should the user initiate another stream change input, the third stream will be readily available for presentation without significant delay.

Figure 10:
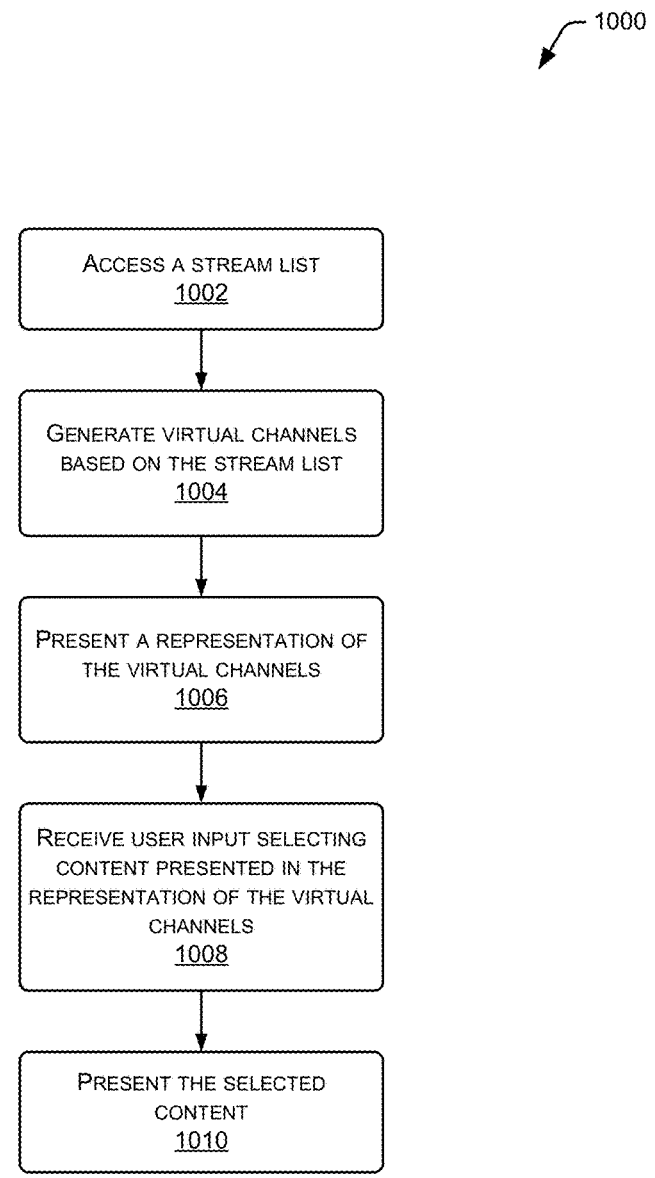
FIG. 10 illustrates a process for generating a stream guide.

FIG. 10 illustrates a process 1000 for generating the stream guide 400. As described above, in some implementations, the streaming media interface 110 may be configured to present the stream guide 400 to aid the user 102 in navigating at least a portion of the information available in the stream list 122. The process may be implemented at least in part by one or more of the content distribution module 120 or the content management module 126, and may be executed on one or more of the media controller 112, the media device 104, or the server 118.

Block 1002 accesses one or more stream lists 122 comprising references to a plurality of pieces of content 124 available by streaming over a network connection from one or more content providers. The stream lists may be generated as described above with regard to FIG. 8.

In some implementations, at least a portion of the pieces of content in the stream list 122 may be received over the network connection from the one or more content providers. This may improve the user experience such that when content 124 is selected presentation may begin promptly.

Block 1004 generates one or more virtual channels 402 based at least in part on the plurality of pieces of content references in the one or more stream lists 122. In one implementation, the generating may comprise associating at least a portion of the plurality of pieces of content 124 with one another by one or more of the selection characteristics 518 and grouping the associated pieces of content into a virtual channel 402. For example, the content 124 having the content metadata 612(1) indicative of the genre science fiction may be combined into a single virtual channel 402, without respect to the content provider supplying the stream in which that content appears.

In another implementation, the virtual channel 402 may comprise the content 124 designated in a particular stream. For example, the content in a particular stream may be grouped into a particular virtual channel 402.

Block 1006 causes display of a representation of the virtual channels 402 on a display. For example, this representation may comprise a grid or matrix as described above with respect to FIG. 4. In other implementations, other representations may be used.

In some implementations, the process may include block 1008 which receives user input selecting content presented in the representation of the virtual channels. For example, the user 102 may use the media device remote 106 or the media controller remote 114 to select a particular piece of content 124 shown in the stream guide 400. Block 1010 then causes presentation of the selected content, such as on the television media device 104(1).

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-implemented method for utilizing processing resources of a computerized system, the computer-implemented method comprising:
    determining one or more selection characteristics, wherein the one or more selection characteristics comprise user-queued content, the user-queued content comprising a first content previously identified for later viewing in a watchlist;
    generating a stream list using the one or more selection characteristics;
    accessing the stream list, the stream list comprising a reference to the first content and a first entry point for the first content, the first entry point specifying a start point within the first content to begin presentation of the first content, the first entry point selected to present a first portion of interest within the first content without presentation of a second portion of interest;
    receiving at least a portion of the first content and a portion of a second content;
    sending the first portion of interest for display on a display device;
    discontinuing receiving the portion of the second content based, at least in part, on determining that a predetermined interval of time has elapsed without receiving a stream change input;
    determining the displayed first portion of interest is within a threshold time period of at least one of a second entry point or an end point of the first portion of interest; and
    at least one of resuming receiving at least the portion of the second content and starting receiving at least a portion of a third content.

2. The method of claim 1, wherein the first content comprises video content.

3. The method of claim 1, wherein the first content is received from a first content provider and the second content is received from another content provider.

4. The method of claim 1, wherein the stream change input comprises a signal indicative of a change of television channel received from a remote control.

5. A method comprising:
    accessing one or more content catalogs from a plurality of content providers, wherein the one or more content catalogs comprise data about pieces of content available for delivery using a network connection;
    determining one or more selection characteristics, wherein the one or more selection characteristics comprise user-queued content, the user-queued content comprising a first content previously identified for later viewing in a watchlist;
    based at least in part on the one or more selection characteristics, generating a stream list, wherein at least a portion of the stream list comprises a plurality of references, a first reference of the plurality of references being to at least a portion of the first content in the watchlist;
    receiving at least a portion of a second content and a portion of a third content;
    sending at least a portion of the second content to an output device for presentation;
    discontinuing receiving the portion of the third content based, at least in part, on determining that a predetermined interval of time has elapsed without receiving a stream change input;
    determining the presented second content is within a threshold time period of at least one of an entry point or an end point of the presented second content; and
    at least one of resuming receiving at least a portion of the third content and starting receiving at least a portion of a fourth content.

6. The method of claim 5, wherein the stream list further comprises a second entry point for the at least a portion of the first content, the second entry point for the at least a portion of the first content specifying a point within the first content at which to begin presentation.

7. The method of claim 5, the method further comprising:
    determining that the at least a portion of the first content is unavailable content; and
    removing the unavailable content from the stream list.

8. One or more tangible non-transitory computer-readable media storing computer-executable instructions that, when executed by at least one processor, configure the at least one processor to perform operations comprising:
    determining one or more selection characteristics, wherein the one or more selection characteristics comprise user-queued content, the user-queued content comprising a first content previously added to a watchlist for later viewing;

generating a stream list using the one or more selection characteristics;

accessing at least a portion of the stream list, the at least a portion of the stream list comprising a reference to a piece of the first content previously identified for later viewing, the stream list further comprising a first entry point for the piece of the first content, the first entry point specifying a start point within the piece of the first content to begin presentation of the first content, the first entry point selected to present a first portion of interest within the piece of the first content without presentation of a second portion of interest;

accessing one or more content catalogs comprising data about the piece of the first content available for delivery using the network connection;

generating one or more virtual channels based at least in part on the piece of the first content referenced in the at least a portion of the stream list;

causing display of a representation of the virtual channels on a display coupled to the at least one processor;

receiving at least a portion of the first content and a portion of a second content;

sending at least a portion of the first content to the display;

discontinuing receiving the portion of the second content based, at least in part, on determining that a predetermined interval of time has elapsed without receiving a stream change input;

determining the displayed first content is within a threshold time period of at least one of a second entry point or an end point of the displayed first content; and at least one of resuming receiving at least the portion of the second content and starting receiving at least a portion of a third content.

9. The computer-readable media of claim 8, the generating further comprising associating at least a portion of the piece of the first content with another piece of the first content by content metadata indicative of the first content and grouping the associated pieces of the first content into a virtual channel without respect to the content provider.

10. The computer-readable media of claim 8, the operations further comprising:

receiving user input selecting the first content for presentation in the representation of the virtual channels.

11. A system, comprising:

a network interface configured to couple to a network;

a media device interface configured to couple to an output device;

at least one memory storing computer-executable instructions; and at least one processor configured to access the network interface, the media device interface, and the at least one memory and execute the computer-executable instructions to:

receive, using the network interface, at least a portion of a first content and a portion of a second content specified in one or more stream lists, wherein the one or more stream lists comprise a pre-determined plurality of references to content available to the system using the network interface, wherein the pre-determined plurality of references to content are determined by one or more selection characteristics, wherein the one or more selection characteristics comprise user-queued content, the user-queued content comprising the first content in a watchlist, the first content previously identified for later viewing, wherein at least a portion of the one or more stream lists comprises a first reference, of the predetermined plurality of references, to a piece of the first content in the watchlist;

send, using the media device interface, at least a portion of the first content to the output device;

discontinue receiving the portion of the second content based, at least in part, on determining that a predetermined interval of time has elapsed without receiving a stream change input;

determine the output first content is within a threshold time period of at least one of an entry point or an end point of the output first content; and at least one of resume receiving at least the portion of the second content and start receiving at least a portion of a third content.

12. The system of claim 11, the instructions further configured to, prior to receiving the first content and the second content, send the content provider a request for the piece of the first content referenced in the at least a portion of the one or more stream lists.

13. The system of claim 11, the instructions further configured to receive the one or more stream lists from a server using the network interface.

14. The system of claim 11, the instructions further configured to generate the one or more stream lists based on one or more content catalogs of available content.

15. The system of claim 11, wherein the one or more selection characteristics further comprise one or more presentation resources and one or more device resources, wherein the one or more presentation resources comprises information about display resolution, three-dimensional capability, and supported audio system functions and the one or more device resources comprises available memory and network bandwidth.

* * * * *